United States Patent
Ono et al.

(10) Patent No.: US 9,618,826 B2
(45) Date of Patent: Apr. 11, 2017

(54) AUTOMATIC FOCUS ADJUSTMENT APPARATUS AND METHOD FOR DRIVING A CAMERA LENS

(71) Applicant: CANON KABUSHIKI KAISHA, Tokyo (JP)

(72) Inventors: Satoshi Ono, Yamato (JP); Tomokazu Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 14/450,022

(22) Filed: Aug. 1, 2014

(65) Prior Publication Data
US 2015/0042868 A1 Feb. 12, 2015

(30) Foreign Application Priority Data
Aug. 9, 2013 (JP) .................................. 2013-167167

(51) Int. Cl.
*G03B 13/36* (2006.01)
*H04N 5/232* (2006.01)
*G03B 3/10* (2006.01)
*G02B 7/28* (2006.01)

(52) U.S. Cl.
CPC ............... *G03B 13/36* (2013.01); *G02B 7/28* (2013.01); *G03B 3/10* (2013.01); *H04N 5/23212* (2013.01); *H04N 5/23245* (2013.01)

(58) Field of Classification Search
None
See application file for complete search history.

(56) References Cited

U.S. PATENT DOCUMENTS

| | | | | |
|---|---|---|---|---|
| 8,385,734 B2* | 2/2013 | Kikuchi | ................. | G02B 7/305 348/345 |
| 2009/0245777 A1* | 10/2009 | Shibuno | ................. | G03B 13/36 396/104 |
| 2009/0256950 A1* | 10/2009 | Kawazoe | ............... | G03B 13/36 348/345 |
| 2011/0044675 A1* | 2/2011 | Uenishi | ................. | G02B 7/102 396/95 |
| 2011/0064397 A1* | 3/2011 | Shibuno | ................. | G03B 17/14 396/133 |
| 2011/0176795 A1* | 7/2011 | Won | ....................... | G02B 7/102 396/133 |

(Continued)

FOREIGN PATENT DOCUMENTS

JP 2009-128611 A 6/2009

*Primary Examiner* — Shahbaz Nazrul
(74) *Attorney, Agent, or Firm* — Canon U.S.A., Inc. IP Division

(57) ABSTRACT

An automatic focus adjustment method for transmitting, from a camera main body side to a lens side, a driving amount of a focus operation member configured to drive a lens, the automatic focus adjustment method includes, when a driving amount according to defocus of an object is transmitted, transmitting a driving permissible time of the focus operation member according to a control method of automatic focus adjustment as well. On the camera main body side, the driving permissible time is acquired according to the set control method of the automatic focus adjustment. On the lens side, drive control of the focus operation member is switched so that a driving time of the focus operation member satisfies the driving permissible time.

20 Claims, 9 Drawing Sheets

(56) References Cited

U.S. PATENT DOCUMENTS

| | | | | |
|---|---|---|---|---|
| 2011/0261251 A1* | 10/2011 | Okamoto | ............... | G02B 7/102 |
| | | | | 348/345 |
| 2012/0182462 A1* | 7/2012 | Hamada | ............. | H04N 5/23212 |
| | | | | 348/352 |
| 2013/0033638 A1* | 2/2013 | Hamada | ............. | H04N 5/23209 |
| | | | | 348/345 |
| 2013/0182171 A1* | 7/2013 | Kawanishi | ............... | G03B 3/10 |
| | | | | 348/345 |
| 2013/0258171 A1* | 10/2013 | Kikuchi | ............. | H04N 5/23212 |
| | | | | 348/353 |
| 2013/0329118 A1* | 12/2013 | Hongu | ............... | H04N 5/23209 |
| | | | | 348/345 |

* cited by examiner

FIG.3

| FRAME SPEED | FOCUSING RING DRIVING PERMISSIBLE TIME | |
| --- | --- | --- |
| | FRAME SPEED PRIORITY | OBJECT TRACKING PRIORITY |
| 12 fps | 41 msec | 61 msec |
| 10 fps | 50 msec | 70 msec |
| 8 fps | 63 msec | 83 msec |

AUTOMATIC FOCUS ADJUSTMENT APPARATUS AND METHOD FOR DRIVING A CAMERA LENS

BACKGROUND OF THE INVENTION

Field of the Invention

The present invention relates to an automatic focus adjustment apparatus and an automatic focus adjustment method of a camera system, particularly, a technique for driving a lens.

Description of the Related Art

There are two major control methods for the automatic focus adjustment. One is a one-shot mode and the other is an artificial intelligence (AI) servo mode. The one-shot mode (i.e., a single autofocus (AF) mode) is used for capturing an image of a stationary object. The autofocusing is started when a shutter button is half-pressed or when other operations are performed, and once the object comes in focus, the focus is locked. The AI servo mode (i.e., a continuous AF mode) is used for capturing an image of a moving object. Unless the shutter is completely turned off, focus detection and lens driving are continuously performed at intervals.

Conventionally, regarding the drive of a focusing ring (i.e., a focus operation member that operates the drive of the lens to bring the object into focus) of a lens, there has been the following trade-off relationship between stopping accuracy and driving time: if priority is given to the stopping accuracy, longer time is required whereas if priority is given to the driving time, stopping accuracy is reduced. In the present circumstances, however, the user-settable settings of cameras are limited to the driving amount and the driving speed of the focusing ring. If the one-shot mode is employed for the automatic focus adjustment, since a user presses the shutter after confirming the in-focus state, higher priority should be given to the stopping accuracy so long as the shutter is not pressed by the user. If the AI servo mode is employed for the automatic focus adjustment, higher priority should be given to the driving time than the stopping accuracy if the drive of the focusing ring is not finished within a predetermined time during the tracking of a moving object.

Japanese Patent Application Laid-Open No. 2009-128611 discusses a camera employing the above-described technique. When the camera performs moving object prediction control, if a focus adjustment lens fails to reach a drive target position and, accordingly, the lens driving is not stopped within a lens driving initial period, a predetermined extension period is set by a lens driving period extension unit and a moving object prediction recalculation unit. Then, during the driving period extension period, the drive control of the focus adjustment lens is performed based on the target position calculated by the moving object prediction recalculation unit.

However, since the user-settable settings of the camera are limited to the driving amount and the driving speed of the focusing ring, the driving end time of the camera is unpredictable. The one-shot mode and the AI servo mode therefore may not function as required. FIG. 9 illustrates such a situation in the conventional techniques by using the relationship between the focusing ring driving speed and time. According to the conventional technique discussed in the above-described Japanese Patent Application Laid-Open No. 2009-128611, the number of frames per unit time (i.e., the frame speed) is likely to gradually decrease, resulting in decreased marginal performance.

SUMMARY OF THE INVENTION

The present invention is directed to an automatic focus adjustment apparatus and an automatic focus adjustment method which are capable of controlling acceleration/deceleration and a driving time of a lens in a camera so that optimum drive control of a focus operation member can be performed in each of the one-shot mode and the AI servo mode.

According to an aspect of the present invention, an automatic focus adjustment apparatus of an imaging apparatus includes a lens configured to form an object image on an image sensor, a lens driving unit including a focus operation member configured to drive the lens, a detection unit configured to detect defocus of the object image, a first control unit configured to acquire a driving amount of the focus operation member from a detection result of the detection unit and acquire a driving permissible time of the focus operation member according to a set control method of automatic focus adjustment, and a second control unit configured to control, based on the driving amount and the driving permissible time of the focus operation member from the first control unit, drive of the focus operation member so that a driving time of the focus operation member satisfies the driving permissible time.

According to another aspect of the present invention, an automatic focus adjustment method of a camera system transmitting, from a camera main body side to a lens side, a driving amount of a focus operation member configured to drive a lens, the automatic focus adjustment method includes acquiring, on the camera main body side, a driving permissible time of the focus operation member according to set a control method of automatic focus adjustment, when a driving amount of the focus operation member according to defocus of an object image is transmitted from the camera main body side to the lens side, transmitting, from the camera main body side, the driving permissible time of the focus operation member according to the control method of the automatic focus adjustment as well, and changing, on the lens side, drive control of the focus operation member so that a driving time of the focus operation member satisfies the driving permissible time.

Further features of the present invention will become apparent from the following description of exemplary embodiments with reference to the attached drawings.

BRIEF DESCRIPTION OF THE DRAWINGS

FIG. 3 illustrates an example of a focusing ring driving permissible time table for an AI servo mode used in the exemplary embodiment of the present invention.

DESCRIPTION OF THE EMBODIMENTS

According to an exemplary embodiment of the present invention, an automatic focus adjustment apparatus having the configuration including a lens driving unit including a focus operation member configured to drive a lens configured to form an object image on an image sensor and a detection unit configured to detect defocus of the object image performs the following control. More specifically, the automatic focus adjustment apparatus acquires a driving amount of the focus operation member from a detection result of the detection unit and a driving permissible time of the focus operation member according to a set control method of automatic focus adjustment. The automatic focus adjustment apparatus then controls, based on the driving amount and the driving permissible time, drive of the focus operation member, that is, the lens, so that a driving time of the focus operation member satisfies the driving permissible time. Satisfying the driving permissible time means performing the drive of the focus operation member, that is, the lens, within the driving permissible time.

Various exemplary embodiments, features, and aspects of the invention will be described in detail below with reference to the drawings. A camera system employing the automatic focus adjustment apparatus or the automatic focus adjustment method according to the present exemplary embodiment will be described with reference to FIGS. 1 to 8.

Figure 1:
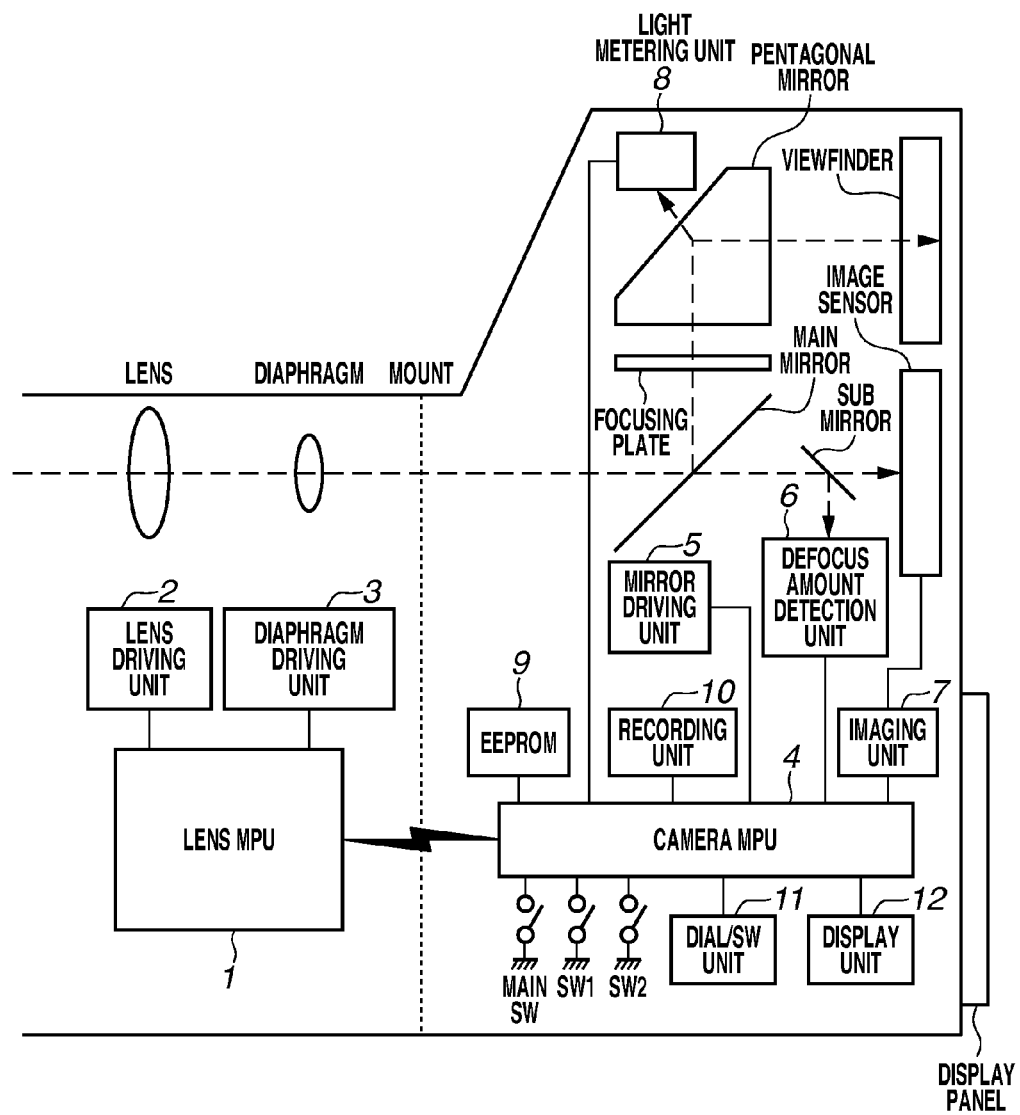
FIG. 1 illustrates an example of a camera system according to an exemplary embodiment of the present invention.

FIG. 1 illustrates a configuration of a camera system according to the present exemplary embodiment. A lens micro processing unit (MPU) 1, which is a second control unit, controls a lens. The lens MPU 1 includes a memory storing a program for controlling the lens. A lens driving unit 2 includes a focus operation member and controls drive of the lens according to an instruction from the lens MPU 1. A diaphragm driving unit 3 controls drive of a diaphragm according to an instruction from the lens MPU 1.

A camera MPU 4, which is a first control unit, controls the entire camera. The camera MPU 4 includes a memory storing a program for controlling the camera. A mirror driving unit 5 drives a main mirror according to an instruction from the camera MPU 4. A defocus amount detection unit 6 detects a defocus amount. An imaging unit 7 controls the entire imaging according to an instruction from the camera MPU 4. When an image of an object is formed on an image sensor via the lens, the imaging unit 7 processes a signal from the image sensor. Then, based on the processed signal, an image is displayed on a display panel according to an instruction from the camera MPU 4, for example. A light metering unit 8 detects brightness. An electrically erasable programmable read-only memory (EEPROM) 9 stores various parameters to be used for the control of the camera.

A recording unit 10 records the captured image according to an instruction from the camera MPU 4. A dial/SW unit 11 is an operation member to be used when a user issues an instruction to the camera. A display unit 12 displays, on the display panel, the captured image, image information associated with the captured image, various types of information of the camera, and camera setting information. The camera and the lens are connected via a mount so that various types of information can be exchanged between the lens MPU 1 and the camera MPU 4.

Figure 2:
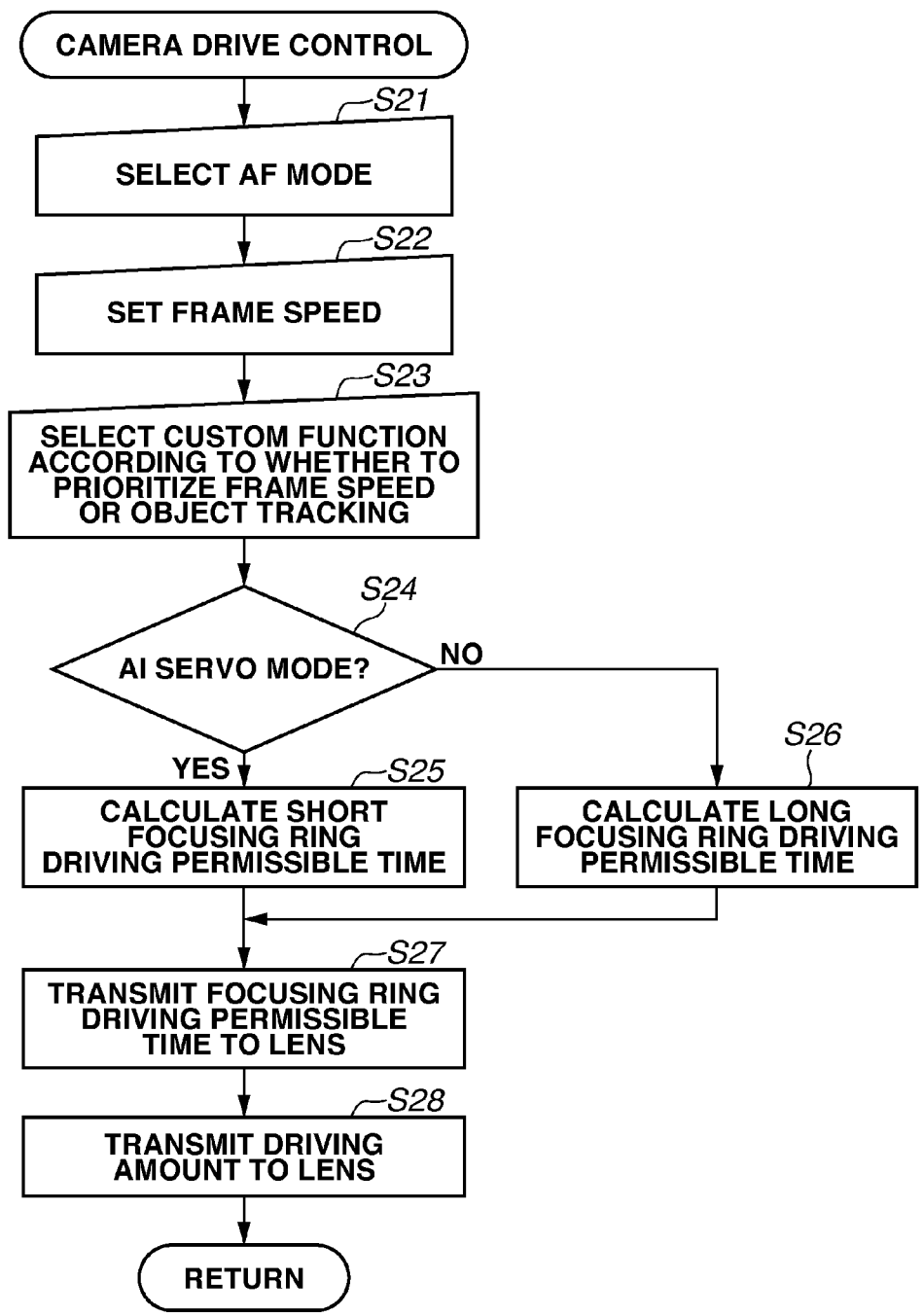
FIG. 2 is a flowchart illustrating an example of drive control performed on a camera main body side of an automatic focus adjustment apparatus according to the exemplary embodiment of the present invention.

The drive control performed by the camera MPU 4 main body side and the drive control mode according to the present exemplary embodiment will be described with reference to the configuration of the camera system in FIG. 1, a flowchart in FIG. 2, and a calculation table of focusing ring driving permissible times in FIG. 3. In step S21, the camera MPU 4 selects an AF mode based on an operation performed on the dial/SW unit 11. In step S22, the camera MPU 4 sets a frame speed based on an operation performed on the dial/SW unit 11. In step S23, the camera MPU 4 selects a custom function according to whether to prioritize the frame speed or object tracking. If the user of the camera skips the processing in steps S21 to S23, the AF mode, the frame speed, and the custom function which are predetermined when the power of the camera has been turned on are used as the settings for the operation of the camera. In step S24, the camera MPU 4 determines whether the AF mode is the AI servo mode. If the AF mode is the AI servo mode (YES in step S24), the processing proceeds to step S25. On the other hand, if the AF mode is not the AI servo mode, in other words, if the AF mode is the one-shot mode (NO in step S24), the processing proceeds to step S26. As described above, when the AF mode is the AI servo mode, a focus ring driving permissible time according to the selected custom function (i.e., whether to prioritize the frame speed or the object tracking), can be transmitted to the lens MPU 1.

In step S25, the camera MPU 4 calculates a short focusing ring driving permissible time for the AI servo mode based on the focusing ring driving permissible time table in FIG. 3. The table in FIG. 3, which is stored in the EEPROM 9, provides optimum focusing ring driving permissible times for the respective combinations of frame speeds and a frame speed prioritized setting or a object tracking prioritized setting. Each driving permissible time described in the table is an optimal value set according to the setting state determined through a simulation or an actual measurement. The short focusing ring driving permissible time for the AI servo mode can also be calculated by the following calculation method different from the method used in step S25. For example, while the shutter is half pressed, the AF focusing cycle (e.g., 100 msec) is determined as the focusing ring driving permissible time. If the shutter is fully pressed, the time from when the shutter is pressed to when exposure is started (e.g., 55 msec) is determined as the focusing ring driving permissible time. Further, while continuous shooting is performed, time to the next exposure timing, which varies according to the frame speed, is determined as the focusing ring driving permissible time. As described above, if the AI servo mode is employed as the control method of the automatic focus adjustment, the focusing ring driving permissible time according to the frame speed set for the AI servo mode can be transmitted to the lens MPU 1.

In the case of the one-shot mode, since the one-shot mode is to be used for capturing an image of a stationary object, the stopping accuracy of the lens driving is prioritized. Accordingly, the driving permissible time is unlimited. Thus, in step S26, the camera MPU 4 calculates a long focusing ring driving permissible time set for the one-shot mode. In other words, when the AF mode is the one-shot mode, the camera MPU 4 transmits a longer driving permissible time to the lens MPU 1 than that when the AF mode is the AI servo mode, whereas when the AF mode is the AI servo mode, the camera MPU 4 transmits a shorter driving permissible time to the lens MPU 1 than that when the AI servo mode is the one-shot mode. In step S27, the camera MPU 4 transmits the calculated focusing ring driving permissible time to the lens MPU 1. In step S28, the camera MPU 4 transmits a focusing ring driving amount to the lens MPU 1. This focusing ring driving amount is calculated by the camera MPU 4 based on the defocus amount (detection result) detected by the defocus amount detection unit 6 which detects the defocus.

Figure 4:
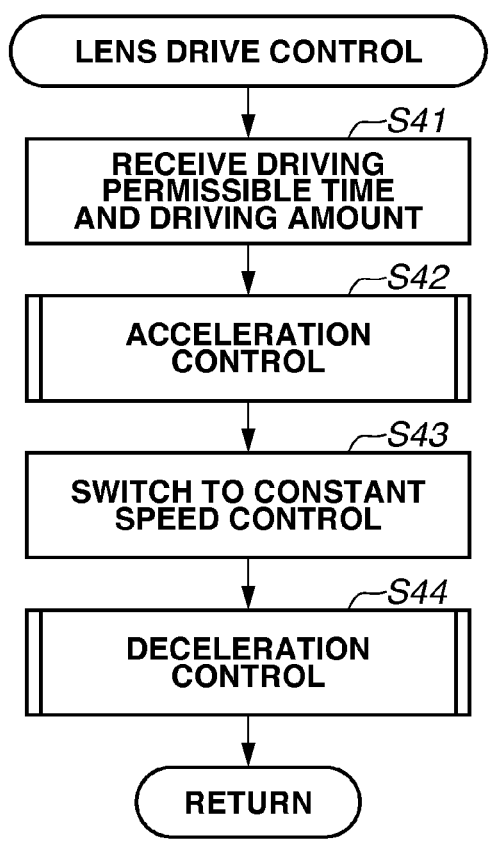
FIG. 4 is a flowchart illustrating an example of drive control performed on a lens side of the automatic focus adjustment apparatus according to the exemplary embodiment of the present invention.
Figure 5:
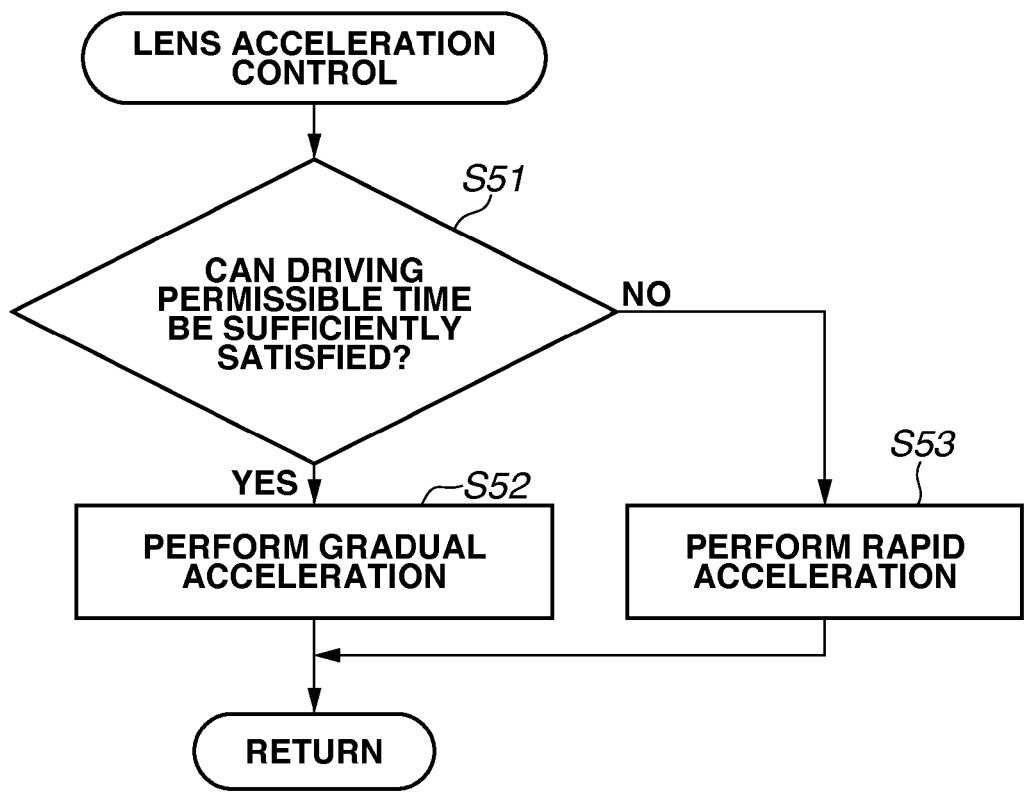
FIG. 5 is a flowchart illustrating an example of acceleration control performed on the lens side of the automatic focus adjustment apparatus according to the exemplary embodiment of the present invention.
Figure 6:
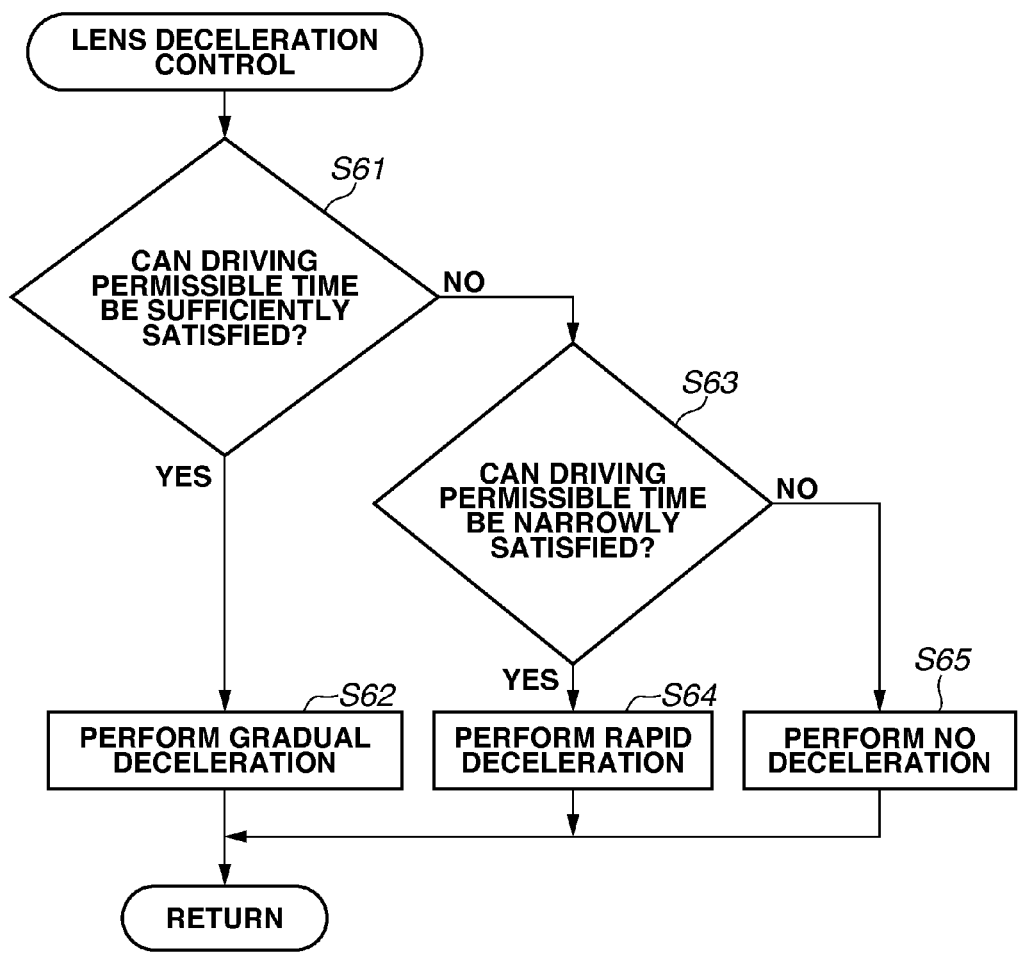
FIG. 6 is a flowchart illustrating an example of deceleration control performed on the lens side of the automatic focus adjustment apparatus according to the exemplary embodiment of the present invention.

The method of the drive control performed by the lens MPU 1 according to the present exemplary embodiment will be described with reference to the configuration of the camera system illustrated in FIG. 1 and the flowcharts in FIGS. 4 to 6. In step S41 in FIG. 4, the lens MPU 1 receives the driving permissible time and the driving amount transmitted from the camera MPU 4. In step S42, the lens MPU 1 performs acceleration control of the lens based on the received driving permissible time and the driving amount. The flowchart in FIG. 5 illustrates the processing performed in step S42. In step S51, the lens MPU 1 determines whether the focusing ring driving permissible time can be sufficiently satisfied. If the focusing ring driving permissible time can be sufficiently satisfied (YES in step S51), the processing proceeds to step S52. If the focusing ring driving permissible time cannot be sufficiently satisfied (NO in step S51), the processing proceeds to step S53. In step S52, the lens MPU 1 gradually accelerates the lens driving. On the other hand, if the focusing ring driving permissible time cannot be sufficiently satisfied (NO in step S51), in step S53, the lens MPU 1 rapidly accelerates the lens driving at a acceleration rate greater than that in step S52. When the acceleration control is completed, the processing proceeds to step S43 in FIG. 4. In step S43, the lens MPU 1 switches the drive control of the lens to a constant speed control.

In step S44, the lens MPU 1 performs deceleration control of the lens based on the received driving permissible time and the driving amount. The flowchart in FIG. 6 illustrates the processing performed in step S44. In step S61, the lens MPU 1 determines whether the focusing ring driving permissible time can be sufficiently satisfied, based on the characteristics (e.g., actuator performance) of the lens driving unit 2. If the focusing ring driving permissible time can be sufficiently satisfied (YES in step S61), the processing proceeds to step S62. If the focusing ring driving permissible time cannot be sufficiently satisfied (NO in step S61), the processing proceeds to step S63. In step S62, the lens MPU 1 gradually decelerates the lens driving. On the other hand, in step S63, the lens MPU 1 determines whether the focusing ring driving permissible time can be narrowly satisfied, based on the characteristics (e.g., actuator performance) of the lens driving unit 2. If the focusing ring driving permissible time can be narrowly satisfied (YES in step S63), the processing proceeds to step S64. If the focusing ring driving permissible time cannot be narrowly satisfied (NO in step S63), the processing proceeds to step S65. In step S64, the lens MPU 1 rapidly decelerates the lens driving at a deceleration rate greater than that in step S62. In step S65, the lens MPU 1 does not decelerate the lens driving. As described above, if the focusing ring driving permissible time can be sufficiently satisfied for the driving amount received by the lens MPU 1, the lens MPU 1 performs gradual deceleration of the focus operation member. On the other hand, if the focusing ring driving permissible time can be narrowly satisfied for the driving amount received by the lens MPU 1, the lens MPU 1 performs more rapid deceleration of the focus operation member compared to the case where the focusing ring driving permissible time can be sufficiently satisfied. Further, when the AI servo mode is used as the control method of the automatic focus adjustment, if the drive of the lens cannot be not finished within the driving permissible time for the driving amount received by the lens MPU 1, the lens MPU 1 does not decelerate the drive of the focus operation member until the lens reaches a target position in expectation of the camera MPU 4 updating the driving amount of the focus operation member. In other words, if the drive of the focus operation member cannot be not finished within the driving permissible time, the lens MPU 1 performs the acceleration/deceleration control in expectation of the update of the driving amount by the camera MPU 4. More specifically, the lens MPU 1 does not decelerate the drive of the focus operation member until the lens reaches the target position. If the camera MPU 4 does not update the focusing ring driving amount, the focus operation member and the lens will substantially overrun the target position.

Figure 7:
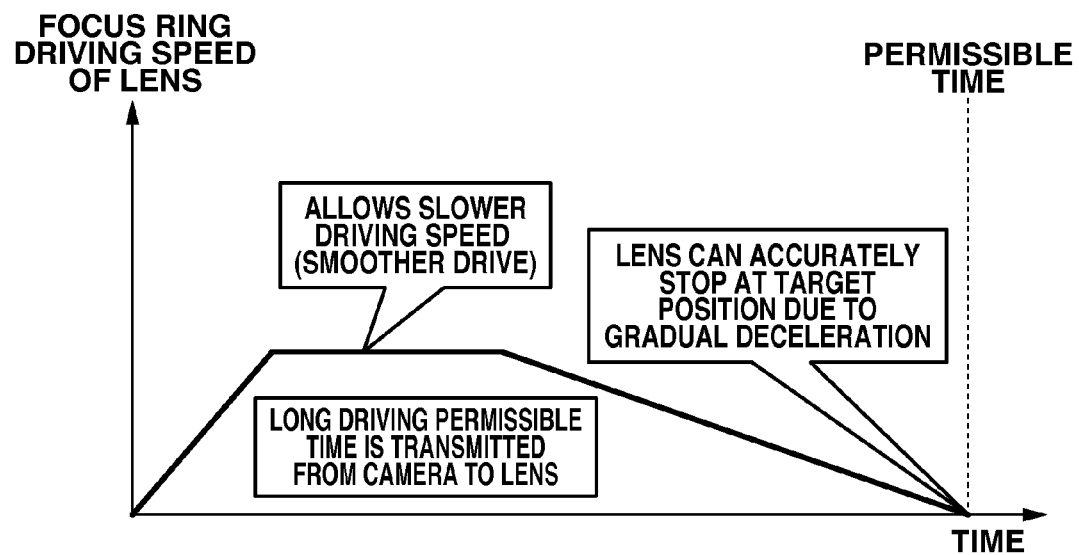
FIG. 7 illustrates an example of drive of the lens in a one-shot mode.
Figure 8:
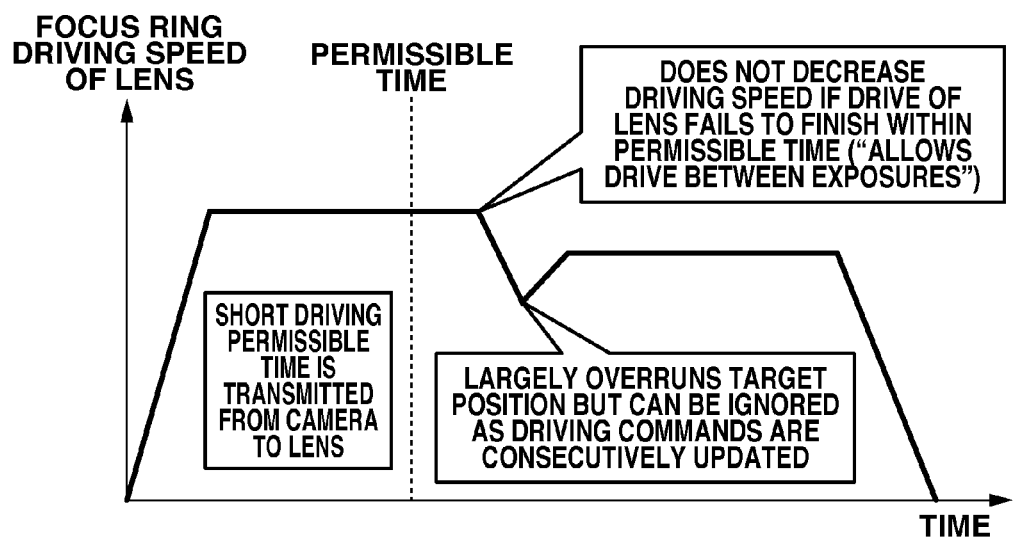
FIG. 8 illustrates an example of drive of the lens in the AI servo mode.
Figure 9:
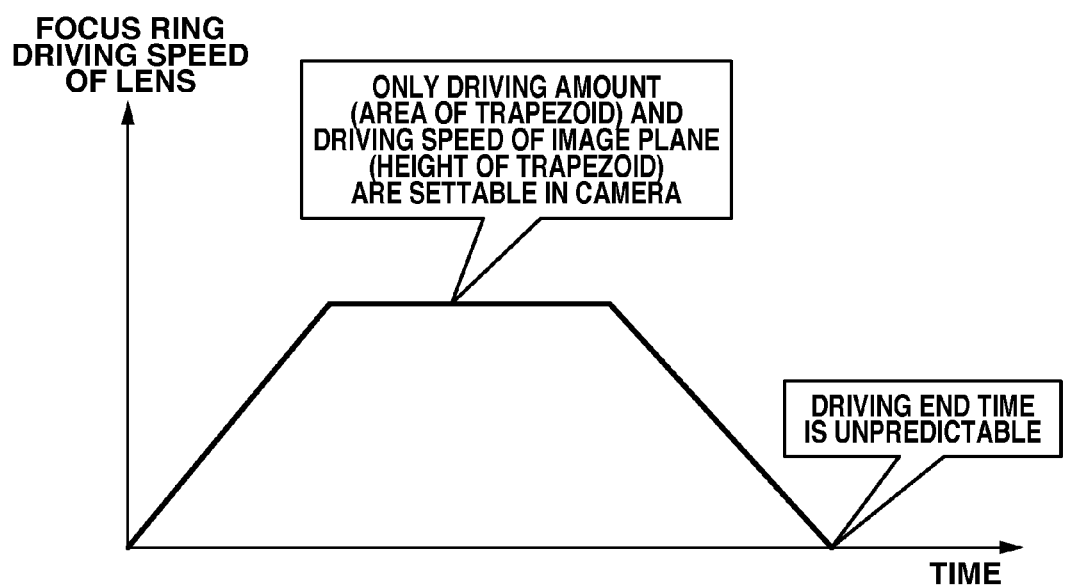
FIG. 9 illustrates a conventional method for driving a lens.

FIG. 7 illustrates the drive state of the lens in the one-shot mode. More specifically, FIG. 7 illustrates the drive state of the lens when the processing in steps S51 to S52 of the flowchart of the acceleration control in FIG. 5 is executed as well as the processing in steps S61 to S62 of the flowchart of the deceleration control in FIG. 6. FIG. 8 illustrates the drive state of the lens in the AI servo mode. More specifically, FIG. 8 illustrates the drive state of the lens when the processing in steps S51 to S53 of the flowchart of the acceleration control in FIG. 5 is executed as well as the processing in steps S61 to S63 and to S65 of the flowchart of the deceleration control in FIG. 6. When the camera is in the AI servo mode, since the drive command is consecutively transmitted from the camera MPU 4, the lens is not driven to a position largely apart from the target stop position even if the lens driving is not decelerated. If the processing in steps S51 to S53 of the flowchart of the acceleration control in FIG. 5 is executed as well as the processing in steps S61 to S63 and to S64 of the flowchart of the deceleration control in FIG. 6, the drive of the lens is more rapidly accelerated by the acceleration control and more rapidly decelerated by the deceleration control according to the control illustrated in FIG. 7.

Embodiments of the present invention can also be achieved by an automatic focus adjustment method and a program causing a computer to execute the automatic focus adjustment method. In other words, a storage medium storing a software program code that realizes the functions (e.g., camera MPU, lens MPU) of the above-described exemplary embodiment is supplied to the camera system. Then a computer (or a central processing unit (CPU) or an MPU) of the system reads the program code stored in the storage medium to execute the above-described functions. In such a case, the program code itself read from the storage medium realizes the functions of the above-described exemplary embodiment, and the program for performing the automatic focus adjustment and the storage medium which stores the program constitute the present invention. The program may be supplied to the camera system via a communication line. More specifically, the automatic focus adjustment method includes acquiring, on the camera main body side, a driving permissible time of the focus operation member according to a set control method of the automatic focus adjustment, when a driving amount of the focus operation member according to defocus of an object image is transmitted from the camera main body side to the lens side, transmitting, from the camera main body side, the driving permissible time of the focus operation member according to the control method of the automatic focus adjustment as well, and changing, on the lens side, drive control of the focus operation member so that a driving time of the focus operation member satisfies the driving permissible time.

An exemplary embodiment of the present invention has been described above. The present invention is, however, not limited to the above-described exemplary embodiment, and various changes and modifications can be applied so long as they fall within the scope of the intent of the present invention.

According to an exemplary embodiment of the present invention, appropriate drive control of the focus operation member can be achieved for each control method of the automatic focus adjustment, that is, for each of the one-shot mode and the AI servo mode.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-167167 filed Aug. 9, 2013, which is hereby incorporated by reference herein in its entirety.

What is claimed is:

1. An automatic focus adjustment apparatus of an imaging apparatus to which a lens unit is detachably attached, the lens unit including a lens configured to form an object image on an image sensor, a lens driving unit including a focus operation member configured to drive the lens and at least one processor or one circuitry which function as a second control unit configured to control a driving speed of the focus operation member, the automatic focus adjustment apparatus comprising:
at least one processor or one circuitry which function as:
a detection unit configured to detect defocus of the object image;
a first control unit configured to acquire a driving amount of the focus operation member from a detection result of the detection unit and acquire a driving permissible time of the focus operation member according to a set control method of automatic focus adjustment including a first mode and a second mode,
wherein the second control unit is configured to control the driving speed of the focus operation member, based on the driving amount and the driving permissible time of the focus operation member from the first control unit, drive of the focus operation member so that the focus operation member drives within the driving permissible time,
wherein the first mode is a mode in which the focus is locked once the object comes in focus, and the second mode is a mode in which is focus detection and lens driving are continuously performed at intervals unless the shutter is completely turned off, and
wherein when the control method of the automatic focus adjustment is the first mode, a driving permissible time longer than a driving permissible time in the second mode is transmitted to the second control unit, and when the control method of the automatic focus adjustment is the second mode, a driving permissible time shorter than a driving permissible time in the first mode is transmitted to the second control unit.

2. The automatic focus adjustment apparatus according to claim 1, wherein when the driving amount of the focus operation member is transmitted from the first control unit to the second control unit, the driving permissible time of the focus operation member is transmitted as well, and the second control unit performs the drive of the focus operation member within the driving permissible time.

3. An automatic focus adjustment apparatus of an imaging apparatus to which a lens unit is detachably attached, the lens unit including a lens configured to form an object image on an image sensor, a lens driving unit including a focus operation member configured to drive the lens and at least one processor or one circuitry which function as a second control unit configured to control a driving speed of the focus operation member, the automatic focus adjustment apparatus comprising:
at least one processor or one circuitry which function as:
a detection unit configured to detect defocus of the object image;
a first control unit configured to acquire a driving amount of the focus operation member from a detection result of the detection unit and acquire a driving permissible time of the focus operation member according to a set control method of automatic focus adjustment including a first mode and a second mode
wherein the second control unit configured to control the driving speed of the focus operation member, based on the driving amount and the driving permissible time of the focus operation member from the first control unit, drive of the focus operation member so that the focus operation member drives within the driving permissible time,
wherein the first mode is a mode in which the focus is locked once the object comes in focus and the second mode is a mode in which focus detection and lens driving are continuously performed at intervals unless the shutter is completely turned off, and
wherein when the control method of the automatic focus adjustment is the servo mode, a driving permissible time according to a frame speed set for the servo mode is transmitted to the second control unit.

4. The automatic focus adjustment apparatus according to claim 3, wherein when the control method of the automatic focus adjustment is the second mode, a driving permissible time according to a custom function set for the second mode according to a selection of whether a frame speed or object tracking is to be prioritized is transmitted to the second control unit.

5. The automatic focus adjustment apparatus according to claim 1, wherein in a case where the driving time of the focus operation member is able to sufficiently satisfy the driving permissible time for the driving amount received by the second control unit, control is performed so that the drive of the focus operation member is gradually accelerated, and in a case where the driving time of the focus operation member is unable to sufficiently satisfy the driving permissible time, control is performed so that the drive of the focus operation member is more rapidly accelerated compared to the case where the driving time of the focus operation member is able to sufficiently satisfy the driving permissible time.

6. The automatic focus adjustment apparatus according to claim 1, wherein in a case where the driving time of the focus operation member is able to sufficiently satisfy the driving permissible time for the driving amount received by the second control unit, control is performed so that the drive of the focus operation member is gradually decelerated, and in a case where the driving time of the focus operation member is able to narrowly satisfy the driving permissible time, control is performed so that the drive of the focus operation member is more rapidly decelerated compared to the case where the driving time of the focus operation member is able to sufficiently satisfy the driving permissible time.

7. The automatic focus adjustment apparatus according to claim 1, wherein when the control method of the automatic focus adjustment is the second mode, if the drive of the focus operation member is unable to be performed within the driving permissible time for the driving amount received by the second control unit, control is performed so that the drive of the focus operation member is not decelerated until updating the driving amount of the focus operation member.

8. An automatic focus adjustment method of a camera system transmitting, from a camera main body side to a lens unit side, a driving amount of a focus operation member configured to drive a lens, the automatic focus adjustment method comprising:
  acquiring, on the camera main body side, a driving permissible time of the focus operation member according to a set control method of automatic focus adjustment including a first mode and a second mode;
  transmitting a driving amount of the focus operation member according to defocus of an object image from the camera main body side to the lens unit side,
  transmitting, from the camera main body side to the lens unit side, the driving permissible time of the focus operation member according to the control method of the automatic focus adjustment; and
  controlling a driving speed of the focus operation member so that the focus operation member drives within the driving permissible time,
  wherein the first mode is a mode in which the focus is locked once the object comes in focus and the second mode is a mode in which focus detection and lens driving are continuously performed at intervals unless the shutter is completely turned off, and
  wherein when the control method of the automatic focus adjustment is the first mode, a driving permissible time longer than a driving permissible time in the second mode is transmitted to the second control unit, and when the control method of the automatic focus adjustment is the second mode, a driving permissible time shorter than a driving permissible time in the first mode is transmitted to the second control unit.

9. A computer-readable non-transitory storage medium storing a program for performing automatic focus adjustment, the program for causing a computer to execute the automatic focus adjustment method according to claim 8.

10. The automatic focus adjustment apparatus according to claim 1, wherein the first control unit acquire the driving permissible time from a table which provides the driving permissible times determined based on the control method.

11. The automatic focus adjustment apparatus according to claim 1, wherein the second control unit performs the drive of the focus operation member within a AF focusing cycle, while a shutter of the imaging apparatus is half pressed.

12. The automatic focus adjustment apparatus according to claim 1, wherein the second control unit performs the drive of the focus operation member within a time from when a shutter of the imaging apparatus is pressed to when exposure is started, when the shutter is fully pressed.

13. The automatic focus adjustment apparatus according to claim 1, wherein the second control unit performs the drive of the focus operation member within a time to the next exposure timing, while the imaging apparatus performs continuous shooting.

14. The automatic focus adjustment apparatus according to claim 1, wherein at least one processor or one circuitry which function as the first control unit is arranged in a camera main body side, at least one processor or one circuitry which function as the second control unit is arranged in a lens side.

15. The automatic focus adjustment apparatus according to claim 1, wherein second control unit configured to control at least either of an acceleration speed of the focus operation member or deceleration speed of the focus operation member.

16. The automatic focus adjustment apparatus according to claim 1, wherein second control unit configured to control an acceleration speed of the focus operation member and deceleration speed of the focus operation member.

17. The automatic focus adjustment apparatus according to claim 7, wherein when the control method of the automatic focus adjustment is the AI servo mode, if the drive of the focus operation member is unable to be performed within the driving permissible time for the driving amount received by the second control unit, control is performed so that the drive of the focus operation member is not decelerated until the lens reaches a target position in expectation of the driving amount of the focus operation member being updated by the first control unit.

18. A lens unit that is detachably attached to an automatic focus adjustment apparatus of an imaging apparatus, the imaging apparatus including:
  at least one processor or one circuitry which function as:
    a detection unit configured to detect defocus of the an object image; and
    a first control unit configured to acquire a driving amount of the a focus operation member from a detection result of the detection unit and acquire a driving permissible time of the focus operation member according to a set control method of automatic focus adjustment including a first mode and a second mode,
  the lens unit comprising:

a lens configured to form the object image on an image sensor;

a lens driving unit including the focus operation member configured to drive the lens; and at least one processor or one circuitry which function as a second control unit configured to control a driving speed of the focus operation member, based on the driving amount and the driving permissible time of the focus operation member from the first control unit, drive of the focus operation member so that the focus operation member drives within the driving permissible time, wherein the first mode is a mode in which the focus is locked once the object comes in focus and the second mode is a mode in which focus detection and lens driving are continuously performed at intervals unless the shutter is completely turned off, and wherein when the control method of the automatic focus adjustment is the first mode, a driving permissible time longer than a driving permissible time in the second mode is transmitted to the second control unit, and when the control method of the automatic focus adjustment is the second mode, a driving permissible time shorter than a driving permissible time in the first mode is transmitted to the second control unit.

19. A lens unit that is detachably attached to an automatic focus adjustment apparatus of an imaging apparatus, the imaging apparatus including:

at least one processor or one circuitry which function as:
  a detection unit configured to detect defocus of an object image; and
  a first control unit configured to acquire a driving amount of a focus operation member from a detection result of the detection unit and acquire a driving permissible time of the focus operation member according to a set control method of automatic focus adjustment including a first mode and a second mode, the lens unit comprising:

a lens configured to form the object image on an image sensor;

a lens driving unit including the focus operation member configured to drive the lens; and at least one processor or one circuitry which function as a second control unit configured to control a driving speed of the focus operation member, based on the driving amount and the driving permissible time of the focus operation member from the first control unit, drive of the focus operation member so that the focus operation member drives within the driving permissible time, wherein the first mode is a mode in which the focus is locked once the object comes in focus and the second mode is a mode in which focus detection and lens driving are continuously performed at intervals unless the shutter is completely turned off, and wherein when the control method of the automatic focus adjustment is the second mode, a driving permissible time according to a frame speed set for the second mode is transmitted to the second control unit.

20. An automatic focus adjustment method of a camera system transmitting, from a camera main body side to a lens unit side, a driving amount of a focus operation member configured to drive a lens, the automatic focus adjustment method comprising:

acquiring, on the camera main body side, a driving permissible time of the focus operation member according to a set control method of automatic focus adjustment including a first mode and a second mode;

transmitting a driving amount of the focus operation member according to defocus of an object image from the camera main body side to the lens unit side, transmitting, from the camera main body side to the lens unit side, the driving permissible time of the focus operation member according to the control method of the automatic focus adjustment; and controlling a driving speed of the focus operation member so that the focus operation member drives within the driving permissible time, wherein the first mode is a mode in which the focus is locked once the object comes in focus and the second mode is a mode in which focus detection and lens driving are continuously performed at intervals, unless the shutter is completely turned off, and wherein when the control method of the automatic focus adjustment is the second mode, a driving permissible time according to a frame speed set for the second mode is transmitted to the second control unit.

* * * * *